United States Patent [19]

Lissmyr et al.

[11] 4,318,530
[45] Mar. 9, 1982

[54] VALVE MECHANISM WITH CONTROLLED OPENING MEANS

[76] Inventors: Per O. Lissmyr, Box 132, S-792 01 Mora; Sven Haglöf, Torrkittvägen 3, S-792 00 Mora, both of Sweden

[21] Appl. No.: 96,602

[22] Filed: Nov. 21, 1979

[30] Foreign Application Priority Data

Nov. 22, 1978 [CH] Switzerland .......... 7812018

[51] Int. Cl.³ .......... F16K 31/143
[52] U.S. Cl. .......... 251/54; 251/77; 251/250
[58] Field of Search .......... 251/36, 47, 52, 53, 251/54, 250, 333, 127, 77, 324, 63.4; 92/65

[56] References Cited

U.S. PATENT DOCUMENTS

| | | | |
|---|---|---|---|
| 710,959 | 10/1902 | Engelhard et al. | 251/52 |
| 795,856 | 8/1905 | Osborne | 351/77 |
| 1,096,220 | 5/1914 | Brooks | 251/54 |
| 1,171,085 | 2/1916 | Beck | 251/54 |
| 1,297,836 | 3/1919 | Gulick | 251/36 |
| 1,722,155 | 7/1929 | Myer | 251/54 |
| 1,725,297 | 8/1929 | Paterson | 251/333 |
| 2,707,378 | 5/1955 | Ryan | 251/63.4 |
| 2,931,615 | 4/1960 | Campbell | 251/54 |
| 3,087,510 | 4/1963 | Normand, Jr. | 251/77 |
| 3,102,711 | 9/1963 | Filliung | 251/54 |
| 3,211,416 | 10/1965 | Billeter et al. | 251/54 |
| 4,227,674 | 10/1980 | Grant, Jr. | 251/54 |

*Primary Examiner*—Martin P. Schwadron
*Assistant Examiner*—G. L. Walton
*Attorney, Agent, or Firm*—Karl W. Flocks; A. Fred Starobin

[57] ABSTRACT

The valve mechanism is of the type which is provided with a device for automatically controlling the motion of the valve body.

The motion of the valve body is determined by the presence of pressure of medium at the outlet end of the valve and is adapted to be controlled by hydraulic damping means connected to the valve body and acting in one direction, manual adjusting means being adapted during opening of the valve, to effect a restricted initial displacement of the valve body in opening direction to permit pressure build-up at the outlet side of the valve.

10 Claims, 3 Drawing Figures

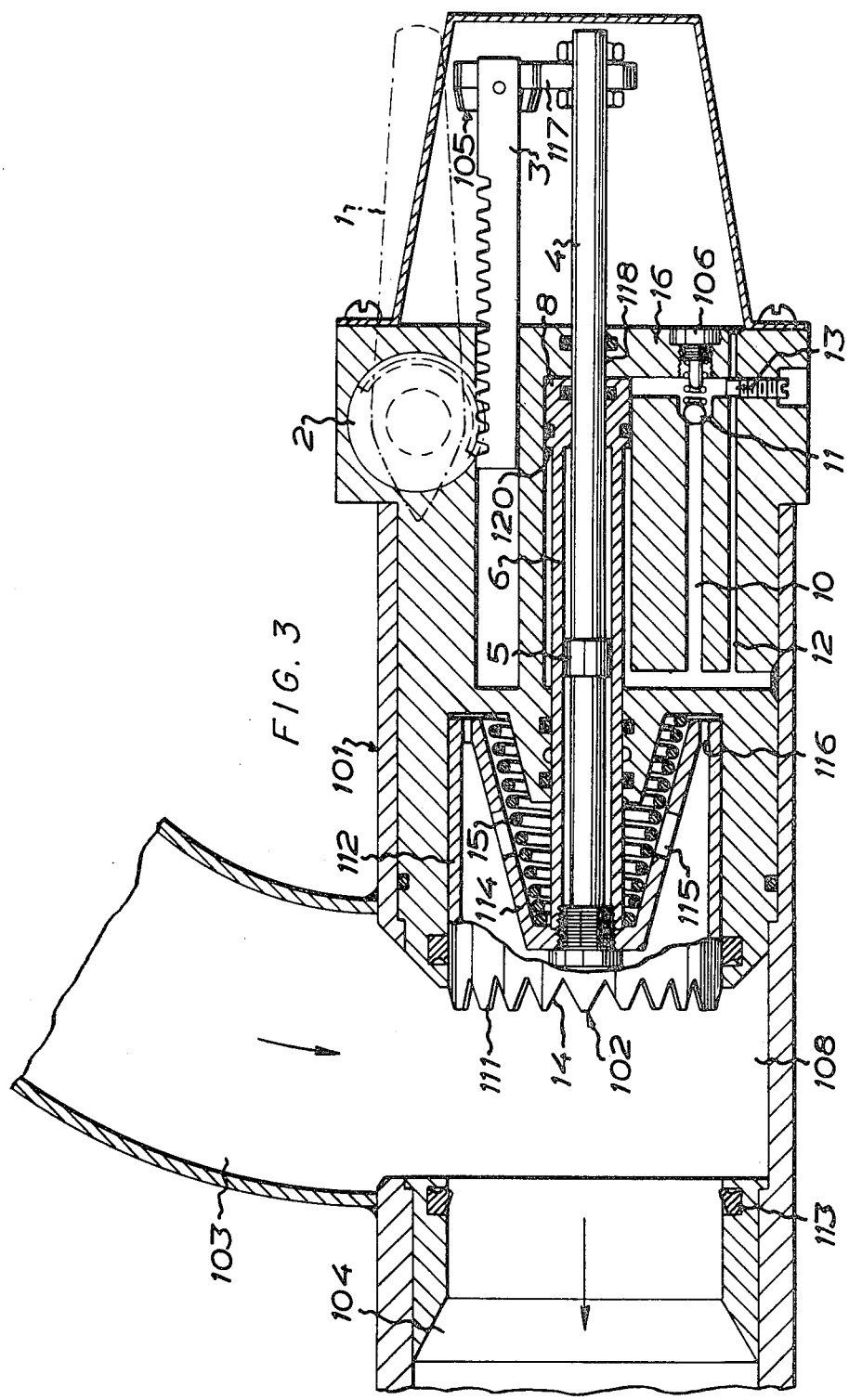

VALVE MECHANISM WITH CONTROLLED OPENING MEANS

This invention relates to a valve mechanism in which the travel of a valve body, regulating the passage through a valve housing, from the inlet to the outlet thereof, and adapted to be displaced in a valve chamber, is positively controlled by means controlling the velocity of the valve body.

The object of the invention is to provide a valve which permits controlled increase of pressure in a conduit tube, hose or the like connected to the outlet of the valve. A problem associated especially with tubes or hoses is that a sudden release of the medium through a valve may cause pressure shocks bursting or otherwise damaging the tube.

Another object is to provide a valve which automatically closes in case the tube or conduit breaks beyond the valve.

Still another object is to provide a valve which not only achieves the above objects but also is designed to automatically close if the pump or like means connected to the valve inlet should come out of function and so also if the valve is set in open position. This gives the advantage that the conduit situated beyond the valve will not risk being subjected to pressure shocks or damages when the pump is started again.

The essential characteristic of the valve according to the invention is that the valve body includes a substantially relievable part regulating the passage through the valve housing and a part which is rigidly connected to said regulating part and is displaceable by pressure like a piston in a cylinder chamber, the valve body is rigidly connected with hydraulic control means which is provided with throttle means and which permits controlled motion of the valve body in the opening direction, and a manually operable adjusting means is adapted to effect initial displacement of the valve body a short distance from the position where it completely shuts off the valve passage, in order to allow restricted throughflow of medium to the outlet side of the valve and a build-up of pressure at this side, which thereupon successively displaces the valve body in opening direction.

An embodiment of a valve according to the invention will be described more fully hereinafter with reference to the accompanying drawings, in which:

FIG. 3 shows the valve with the valve body in a complete opening position and the adjusting means in open position.

Figure 1:
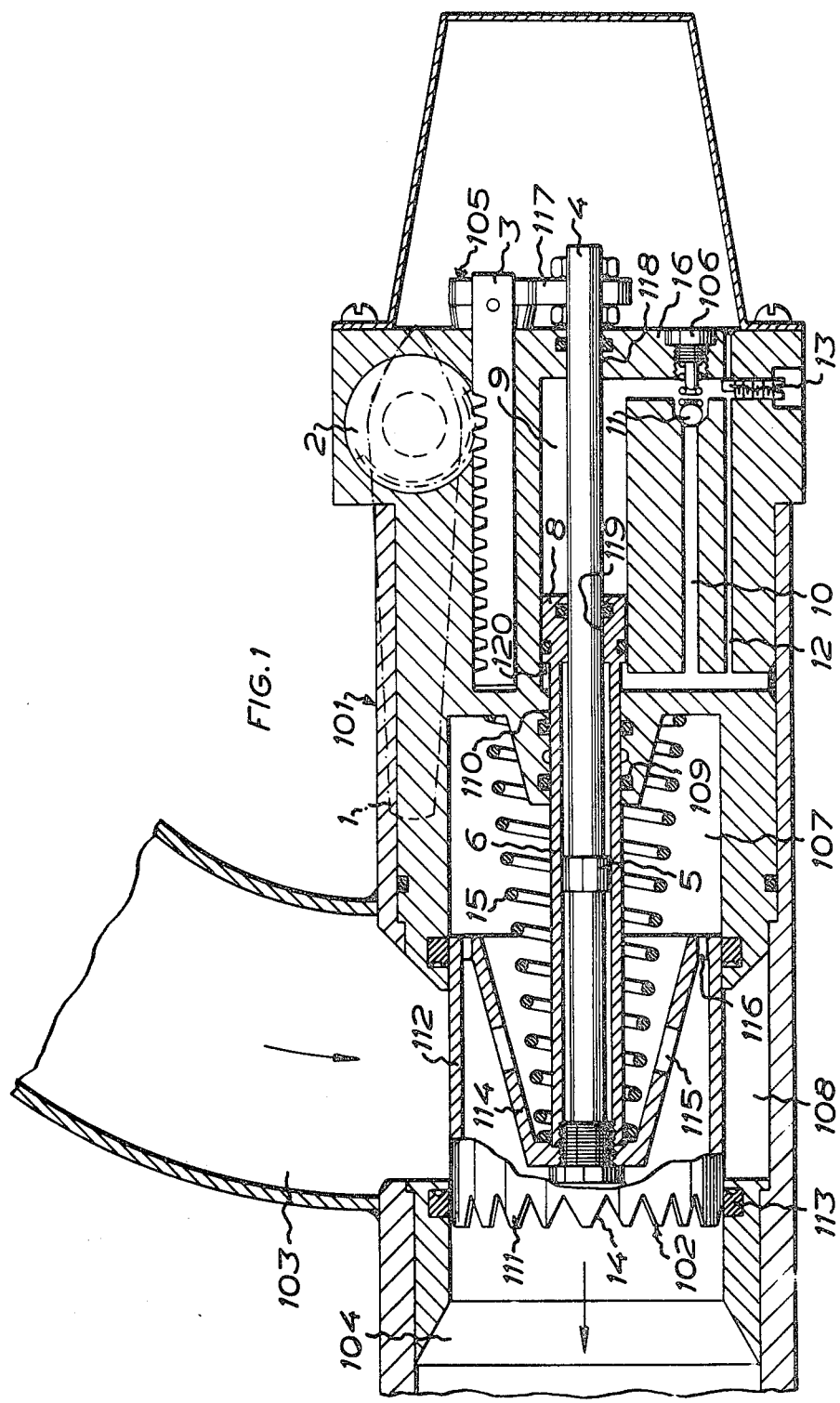
FIG. 1 is a cross-sectional view of the valve with the valve body in closing position and the adjusting means in closed position.

The main parts of the valve consist of a valve housing 101, a valve body 102, an inlet 103, an outlet 104, adjusting means 105 and control means 106.

The valve housing 101 includes a cylindrical chamber 107 which is closed at one end and merges in the outlet 104 at the other end. The inlet 103 adjoins essentially radially the open end of the chamber 107. Provided in the wall of the chamber 107, on a level with the inlet 103, is a circumferentially extending recess 108 which is open towards said chamber. A passage 110, provided with seals 109, is arranged at the closed end of the chamber 107.

The valve body 102 consists of the valve member proper 111 which, in the embodiment shown, is of W-shaped cross-section but it may equally be generally H- or C-chaped. The outer portion 112 of the member 111 has a cylindrical envelope surface which at its remote edge is provided with indentations 14, and this portion adjoins the wall of the chamber 107 and in closed position it bridges and sealingly closes the inlet 103 and the recess 108 connected therewith. Seals 113 are provided on either side of the inlet 103 and the recess 108.

That portion 114 of the valve member 111 which is situated inwardly of the cylindrical portion 112 is provided with throughflow openings 115 and drain openings 116 which allow medium from the outlet side to pass freely into and out of the space inside the valve member 111.

The valve member 111 will thus be entirely relieved.

Secured in the central portion of the valve member 111 is a tubular valve rod 6 which extends through the passage 110 into a control cylinder 9 on the other side of said passage.

The ends of the control cylinder 9 are connected with each other via two passageways, one passageway 10 which is provided with a non-return valve 11 and another passageway 12 which is provided with an adjustable throttling means 13.

A control piston 8 is fixedly secured in that end of the valve rod 6 which extends into the control cylinder 9 and, consequently, the control piston will be displaced in its cylinder 9 as the valve body 102 is displaced in the valve chamber 107.

The operating means includes a handle 1 which is connected with a gear wheel 2 cooperating with a rack 3. The rack is by means of a yoke 117 rigidly connected with an adjusting or operating rod 4.

The adjusting rod 4 extends through an opening 118, provided with seals, at the rear end 16 of the valve housing and passes freely along the control cylinder 9 through an opening 119, provided with seals, in the control piston 8, and into the tubular valve rod 6. An abutment 5 which, together with the rod 4, is freely movable in the tubular rod 6, is fixedly secured to that portion of the adjusting rod 4 which extends into the valve rod 6, at a distance from the end of the rod 4 which is somewhat less than the length of stroke or travel of the valve body. As the opening 119 in the control piston 8 has an area which adjoins the adjusting rod 4, the abutment 5 can engage that portion 120 of the control piston 8 which surrounds the opening 119 and faces the interior of the tubular rod 6.

Between that portion of the valve housing which defines the valve chamber 107 and is provided with the passage 110, and the valve body 102 a spring 15 is clamped in such a way that it tends to displace the valve body towards its closing position, i.e. the position shown in FIG. 1.

The function of the valve is as follows.

In the position shown in FIG. 1 the operating handle 1 is set in closed position and the adjusting rod 4 is, via the rack 3, brought to bear against the closed end of the valve rod 6 which is attached to the valve body 102.

Figure 2:
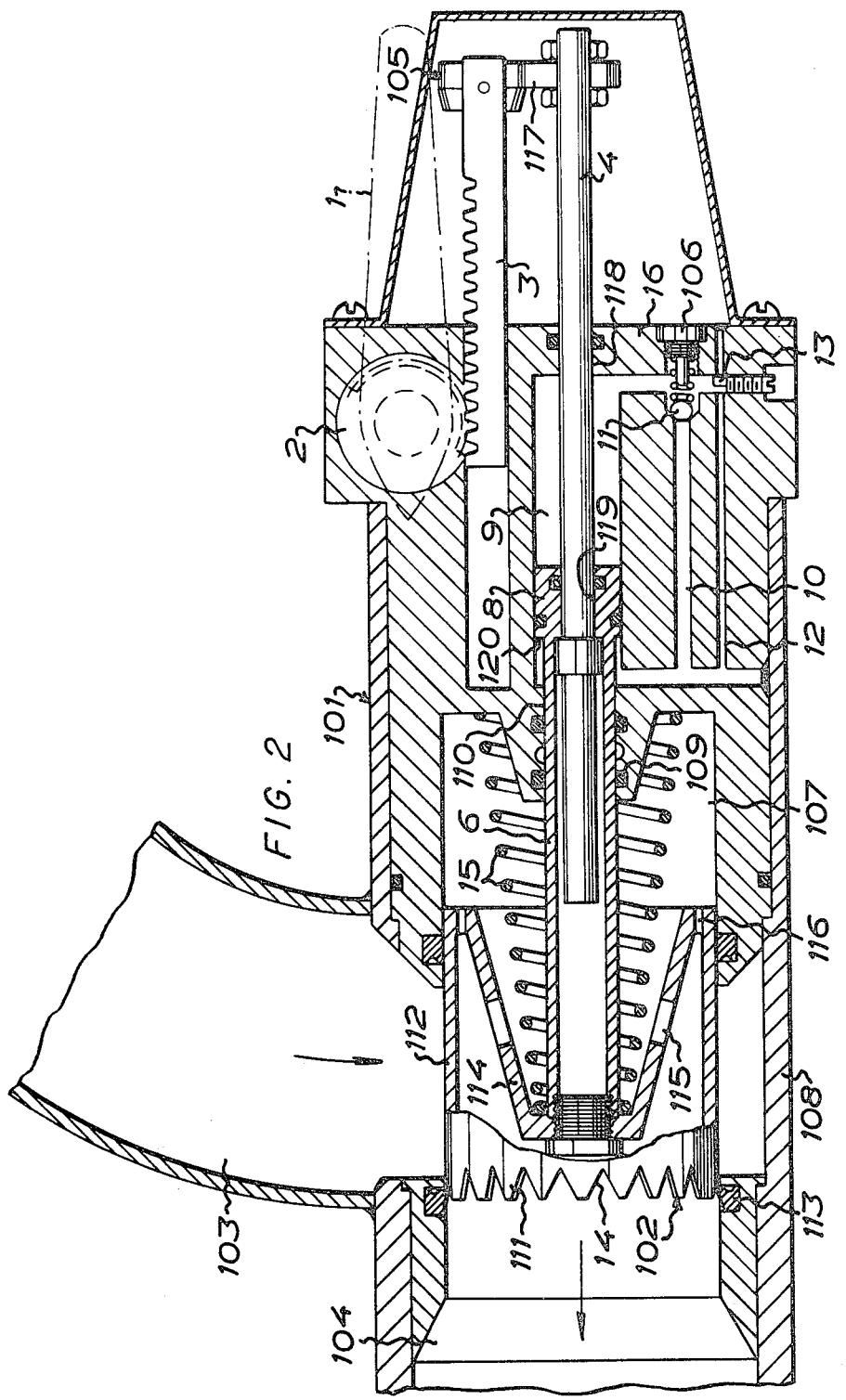
FIG. 2 shows the same valve with the valve body in the position it takes at the beginning of the opening movement and with the adjusting means in open position.

When the valve is to be opened the handle is swung to the open position shown in FIG. 2, whereby the rack is displaced in outward direction while drawing the adjusting rod 4 with it. During the final stage of this displacement the adjusting rod abutment 5 will meet the portion 120 of the control piston which is attached to the valve rod, resulting in the valve body 102 being entrained a short distance against the action of the spring 15. On condition that there is medium under pressure at the inlet 103 a limited amount of medium will enter through the openings which are uncovered because the indentations 14, as shown in FIG. 2, project past the edge of the circumferential recess 108. The medium that has arrived in the outlet 104 and the conduit on the other side thereof causes that pressure build-up will gradually take place therein. When the pressure in question, which acts upon that portion of the valve rod 6 which extends into the valve chamber and acts as a piston, exceeds the force of the spring 15 acting in the opposite direction, the valve body 102 will start moving towards completely open position. It may be mentioned here that at this stage the valve member 111, i.e. the W-shaped portion, is relieved because medium overflows to the opposite inner side via the openings 115 and 116.

The travel of the valve body towards the entirely open position shown in FIG. 3 is controlled in that the control piston 8 is compelled, against the action of the throttle means 13, to displace hydraulic liquid from one end to the other end of the cylinder 9.

If a pressure drop should occur, after the valve has opened, in the conduit connected to the outlet 104, either due to rupture of the tube or conduit or because the pump or the like has come out of function, then the spring 15 will displace the valve body towards the almost completely closed position shown in FIG. 2, since the pressure of medium, which acts upon the valve rod 6 and which would otherwise overcome the spring force, ceases.

When the tube rupture has been repaired and the pump has been started again, the valve will successively open, as has been described above, as pressure can build up again on its outlet side.

When the valve is to be closed, the handle 1 is turned to the closed position according to FIG. 1, whereby the rack 3 is displaced inwardly and presses in the adjusting rod 4 which, in turn, positively displaces the valve body towards completely closed position by engaging the end of the tubular valve rod 6.

A delayed regulation of the valve body motion takes place during a closing operation caused by pressure loss at the outlet and/or inlet and also when the valve is closed manually, since the hydraulic liquid from one cylinder end to the other passes through the passageway 10 provided with the non-return valve.

When the valve is closed and the outlet conduit is gradually emptied, the medium situated inwardly of the valve member 111 will be drained through the openings 115 and 116. The valve will become quite empty, which means that, if the valve is used for water, the risk of freezing to pieces is eliminated.

The invention should not be considered limited to that described above and shown in the drawings but may be modified in various ways within the scope of the appendant claims.

What we claim and desire to secure by Letters Patent is:

1. A valve mechanism in which the travel of a valve body regulating the passage through a valve housing, from the inlet to the outlet thereof, and adapted to be displaced in a valve chamber, is positively controlled by means controlling the velocity of the valve body, wherein the valve body (102) includes a valve means (112) regulating the passage through the valve housing (101) and piston means (6, 8) rigidly connected to said valve body and is displaceable by fluid pressure at the outlet side of the valve body, the valve body (102) is rigidly connected with hydraulic damping control means (8–13) which is provided with a throttle means and which permits controlled motion of the valve body in the opening direction, and a manually operable adjusting means (1, 2, 3, 4 and 5) is adapted to effect initial displacement of the valve body a short distance from the position where it completely shuts off the valve passage, in order to allow restricted throughflow of medium to the outlet side of the valve body and a build-up of pressure at this side, which thereupon successively displaces the valve body in the opening direction, and the piston includes a first portion sealingly disposed in a damping control cylinder (9) and a second portion being exposed to the build-up pressure at the outlet side of the valve body after said adjusting means engages said piston means to effect said initial displacement.

2. A mechanism as claimed in claim 1, wherein the valve body (102) is provided with an edge portion with indentations or the like (14) adapted to admit a restricted throughflow of medium upon a limited initial displacement from closing position.

3. A mechanism as claimed in claim 1, wherein the two ends of the control cylinder (9) are connected by means of two by-pass passages for the hydraulic liquid therein, one (12) having suitably controllable throttle element (13) through which liquid passes when the piston means is displaced in the opening direction of the valve, and the other (10), provided with a non-return valve (11), through which liquid flows when the piston means is displaced in the closing direction of the valve body.

4. A mechanism as claimed in claim 1, wherein a spring means (15) is arranged between the valve housing (101) and the valve body (102) in order to act upon the valve body towards its closing position, independently of the position of the adjusting means.

5. A mechanism as claimed in claim 1, wherein the adjusting means includes a gear wheel or the like (2), which is rotatable by means of a handle (1) and adapted to act upon a rack (3) connected to the adjusting rod (4).

6. A valve mechanism in which the travel of a valve body regulating the passage through a valve housing, from the inlet to the outlet thereof, and adapted to be displaced in a valve chamber, is positively controlled by means controlling the velocity of the valve body, wherein the valve body (102) includes a valve means (112) regulating the passage through the valve housing (101) and piston means (6, 8) rigidly connected to said valve body and is displaceable by fluid pressure at the outlet side of the valve body, the valve body (102) is rigidly connected with hydraulic control means (8–13) which is provided with a throttle means and which permits controlled motion of the valve body in the opening direction, and a manually operable adjusting means (1, 2, 3, 4 and 5) is adapted to effect initial displacement of the valve body a short distance from the position where it completely shuts off the valve passage, in order to allow restricted throughflow of fluid medium to the outlet side of the valve and a build-up of pressure of the fluid medium at this side, which acting on the piston means to successively displace the valve body in the opening direction, and the valve body (102) further includes a member (111) of substantially W-shaped cross-section and an outwardly facing cylindrical envelope surface (112) of which is adapted to run along and adjoin an inwardly facing surface of a cylindrical chamber (107) in the valve housing (101), the valve inlet (103) opens substantially radially into said chamber (107) adjacent one end thereof which is open towards the outlet (104), a passage (110) is provided at the other end of the chamber for receiving said piston means having a tubular rod (6) which is rigidly connected to the valve body (102) and closed at the end connected with said body (102), said rod (6) enters, beyond the passage (110), into a damping cylinder (9) including an adjustable control means (106), where it carries a control piston (8) which is movable in said cylinder and has a through opening (119) of smaller area than the opening in the tubular rod (6), an adjusting or operating rod (4) extends through the damping cylinder (9) and through the opening (119) in the piston (8) thereof and into the tubular rod (6), the adjusting or operating rod (4) has, situated at a distance from its end entering the tubular rod, which is somewhat less than the total length of travel or stroke of the valve body (102), an abutment (5) adapted to engage the portion (120) of the control piston (8) facing the valve body at the end of the displacement of the control rod (4) from its closed position to its open position, in order to effect the restricted valve body displacement uncovering a portion of the inlet.

7. A mechanism as claimed in claim 6, wherein the valve body (102) is provided with an edge portion with indentations or the like (14) adapted to admit a restricted throughflow of medium upon a limited initial displacement from the closing position.

8. A mechanism as claimed in claims 6 or 7, wherein the two ends of the damping cylinder (9) are connected by means of two by-pass passages for the hydraulic liquid therein, one (12) having suitably controllable throttle means (13) through which liquid passes when the control piston (8) is displaced in the opening direction of the valve, and the other (10), provided with a non-return valve (11), through which liquid flows when the control piston is displaced in the closing direction of the valve.

9. A mechanism as claimed in claim 6, wherein the portion (112) of the valve body (102) engaging the wall of the cylindrical chamber (107) is relieved of pressure through openings (115, 116) permitting substantially axial throughflow of medium and being arranged between the cylindrical portion (112) engaging the surface of the valve chamber and the tubular rod (6), the pressure gradually built up in the outlet conduit solely acting upon and tending to displace the tubular rod.

10. A mechanism as claimed in claim 6, wherein the valve inlet (103) includes an annular circumferentially extending recess (108) adjoining the inlet and open towards the cylindrical chamber (107).

* * * * *